(12) United States Patent
Michibata et al.

(10) Patent No.: US 9,791,829 B2
(45) Date of Patent: Oct. 17, 2017

(54) AIR CLEANER AND IMAGE FORMING DEVICE WITH AIR CLEANER

(71) Applicant: Konica Minolta, Inc., Chiyoda-ku, Tokyo (JP)

(72) Inventors: Takumi Michibata, Toyokawa (JP); Yoshinori Ohno, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/015,544

(22) Filed: Feb. 4, 2016

(65) Prior Publication Data
US 2016/0246254 A1    Aug. 25, 2016

(30) Foreign Application Priority Data
Feb. 25, 2015   (JP) .................................. 2015-035337

(51) Int. Cl.
G03G 21/00    (2006.01)
G03G 21/20    (2006.01)
B01D 46/00    (2006.01)

(52) U.S. Cl.
CPC ....... *G03G 21/206* (2013.01); *B01D 46/0045* (2013.01); *G03G 2221/1645* (2013.01)

(58) Field of Classification Search
CPC ......... G03G 21/206; G03G 2221/1645; B01D 46/0045; B01D 46/0046; B01D 2201/44
(Continued)

(56) References Cited

U.S. PATENT DOCUMENTS

| 2,242,278 A | * | 5/1941 | Yonkers, Jr. | ............ A47L 9/125 |
| | | | | 15/327.6 |
| 4,061,082 A | * | 12/1977 | Shuler | ................... F24F 13/068 |
| | | | | 454/298 |

(Continued)

FOREIGN PATENT DOCUMENTS

| JP | 4-242271 A | 8/1992 |
| JP | 07-311519 A | 11/1995 |

(Continued)

OTHER PUBLICATIONS

Extended European Search Report dated Jun. 22, 2016 issued by the European Patent Office in corresponding European Patent Application No. 16155874.7 (7 pages).

(Continued)

*Primary Examiner* — Robert Beatty
(74) *Attorney, Agent, or Firm* — Buchanan Ingersoll & Rooney PC

(57) ABSTRACT

An air cleaner having a filter, causing air to pass through the filter and discharging the filtered air. The air cleaner includes: an air duct having an inlet via which air is received and an outlet facing a first part of a main surface of the filter and via which the received air is output towards the first part of the main surface; a fan causing air to be received by the air duct via the inlet, to be output from the air duct via the outlet, and to pass through the filter; and a flow distributer disposed between the outlet and the filter. The flow distributer changes a direction of flow of air output from the air duct from towards the first part of the main surface to towards a second part of the main surface of the filter that does not facing the outlet.

12 Claims, 8 Drawing Sheets

(58) Field of Classification Search
USPC ..... 399/93; 361/678, 679.49, 679.5, 679.51; 137/338, 339; 95/267, 268, 271, 272, 95/273; 55/418, 437, 462, 463
See application file for complete search history.

(56) References Cited

U.S. PATENT DOCUMENTS

| | | | |
|---|---|---|---|
| 4,264,190 A | 4/1981 | Tsuda et al. | |
| 4,646,558 A * | 3/1987 | Gualtieri | B01D 46/0005 55/418 |
| 7,006,778 B2 * | 2/2006 | Mitchell | G03G 15/0887 399/222 |
| 8,639,149 B2 * | 1/2014 | Tanaka | B41J 29/13 399/93 |
| 2007/0251199 A1 * | 11/2007 | Valentini | B23Q 11/0046 55/385.1 |

FOREIGN PATENT DOCUMENTS

| | | | |
|---|---|---|---|
| JP | 2001116310 A | * | 4/2001 |
| JP | 2002-014583 A | | 1/2002 |
| JP | 2002-318513 A | | 10/2002 |
| JP | 2006-208718 A | | 8/2006 |
| JP | 2011164510 A | * | 8/2011 |

OTHER PUBLICATIONS

Notification of Reasons for Refusal issued by the Japanese Patent Office in corresponding Japanese Patent Application No. 2015-035337 dated Feb. 7, 2017 (5 pages including partial English translation).

* cited by examiner

AIR CLEANER AND IMAGE FORMING DEVICE WITH AIR CLEANER

CROSS-REFERENCE TO RELATED APPLICATIONS

This application is based on application No. 2015-035337 filed in Japan, the contents of which are hereby incorporated by reference.

BACKGROUND (1) Field of the Invention

The present disclosure is related to an air cleaner that takes in air discharged from a fixing device and the like included in an image forming device such as a printer, a copier, or a multifunctional peripheral (MHP), causes the air from the fixing device and the like to pass through a filter, and discharges the filtered air.

(2) Related Art

Conventionally, a fixing device, etc., included in an image forming device such as a printer or a copier may generate undesirable airborne substances such as volatile organic compounds (VOCs) and the like. Such undesirable airborne substances, when discharged to the outside of the image forming device, may negatively affect office environment. Thus, in order to achieve a comfortable office environment, a conventional image forming device is provided with a mechanism that takes in air from the image forming device, which contains the undesirable airborne substances discharged from the fixing device, etc., causes the air from the image forming device to pass through a filter, and discharges the filtered air.

Such a mechanism is commonly referred to as an air cleaner, and typically includes, in addition to a filter, a discharge fan and an air duct.

Recently, more interest is being directed to maintaining a clean office environment. This trend gives rise to the necessity of improving filter performance of air cleaners and thereby reducing the amount of undesirable airborne substances discharged to the outside of image forming devices to as small an amount as possible. Filter performance may be improved, for example, by increasing filter surface area and filter thickness. However, increasing filter thickness unfortunately brings about an increase in depth-direction length of image forming devices, which results in inefficient use of office space. As such, typically, filter surface is increased to improve filter performance.

For example, Japanese Patent Application Publication No. 2002-014583 (referred to in the following as Patent Literature 1) discloses one example of a technology for achieving such an improvement in filter performance without increasing the overall size of an image forming device. In specific, Patent Literature 1 discloses an air cleaner (a dust removing device) that has a pleated filter (i.e., a pleats part 6) that achieves both compact size and increased filter surface area. In addition, Patent Literature 1 discloses a structure where a cross-sectional area of an air flow path in the air cleaner, which guides air from the image forming device containing undesirable airborne substances to the filter, increases considerably upon reaching an inlet of a part where the filter (i.e., the pleats part 6) is accommodated, and where the inlet and the filter are located close to one another.

Accordingly, the air cleaner disclosed in Patent Literature 1 improves filter performance without increasing overall image forming device size.

Meanwhile, as described above, Patent Literature 1 discloses a structure where the air flow path in the air cleaner expands considerably upon reaching the inlet of the part where the filter is accommodated, and where the inlet and the filter are located close to one another. This structure causes air containing undesirable airborne substances, upon being taken in to the part where the filter is accommodated via the inlet, to be mainly guided towards an area of the filter that faces the inlet, before spreading over the entirety of the surface of the filter. This results in the filter capturing the undesirable airborne substances mainly at an area thereof facing the inlet, which then results in a decrease of filter performance (i.e., the ability of capturing undesirable airborne substances) occurring at a faster rate at the area facing the inlet than at other areas of the filter. As a result, filter clogging is accelerated at the area facing the inlet, which shortens filter lifetime.

In view of such technical problems, the present disclosure aims to provide an air cleaner that suppresses a local decrease in filter performance, and an image forming device including such an air cleaner.

SUMMARY

To achieve at least one of the abovementioned aims, an air cleaner reflecting one aspect of the present disclosure is an air cleaner having a filter, causing air from an image forming device to pass through the filter and discharging the filtered air, the air cleaner including: an air duct having an inlet via which air from the image forming device is received and an outlet facing a first part of a main surface of the filter and via which the received air is output in a direction towards the first part of the main surface; a fan causing air from the image forming device to be received by the air duct via the inlet, to be output from the air duct via the outlet, and to pass through the filter; and a flow distributer disposed between the outlet and the filter, the flow distributer changing a direction of flow of air output from the air duct from the direction towards the first part of the main surface to a direction towards a second part of the main surface of the filter, the second part being a part of the main surface that does not face the outlet.

In the air cleaner reflecting one aspect of the present disclosure, it is desirable that the air duct have a curve between the inlet and the outlet, and a path of air flow have greater cross-sectional area between the outlet and the main surface of the filter than at the outlet.

In the air cleaner reflecting one aspect of the present disclosure, it is desirable that the flow distributer have a mountain-shaped protrusion protruding towards the outlet.

The air cleaner reflecting one aspect of the present disclosure desirably further includes a plurality of ribs disposed about the outlet, and it is desirable that the flow distributer be supported by the ribs.

In the air cleaner reflecting one aspect of the present disclosure, it is desirable that the flow distributer have at least one through hole penetrating through a main surface thereof facing the outlet.

BRIEF DESCRIPTION OF THE DRAWINGS

These and other objects, advantages and features of the invention will become apparent from the following description thereof taken in conjunction with the accompanying drawings those illustrate a specific embodiment of the invention.

In the drawings.

DESCRIPTION OF PREFERRED EMBODIMENTS

The following describes an image forming device pertaining to one embodiment of the present disclosure, with reference to the accompanying drawings.

[1] Structure of Image Forming Device

Figure 1:
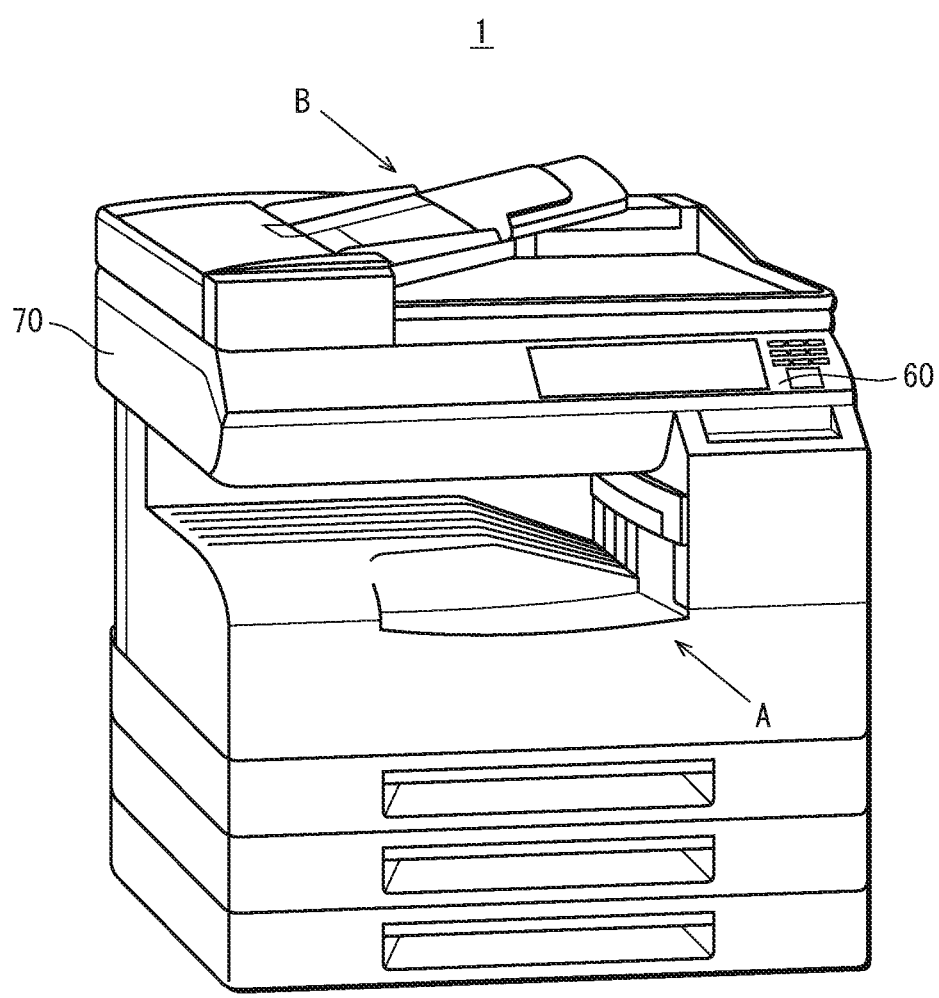
FIG. 1 is a perspective view illustrating the exterior of an image forming device 1 pertaining to an embodiment.

FIG. 1 is a perspective view illustrating the exterior of the image forming device pertaining to the present embodiment (image forming device 1). The image forming device 1 is a multifunctional peripheral (MFP). The image forming device 1 includes an operation panel 60, an air cleaner (not depicted in FIG. 1), and an image reader 70. The operation panel 60 is located at a front side of the image forming device 1, which is indicated by arrow A in FIG. 1. The air cleaner is located at a rear side of the image forming device 1, which is indicated by arrow B in FIG. 1. The image reader 70 is located above the housing of a main part of the image forming device 1.

Figure 2:
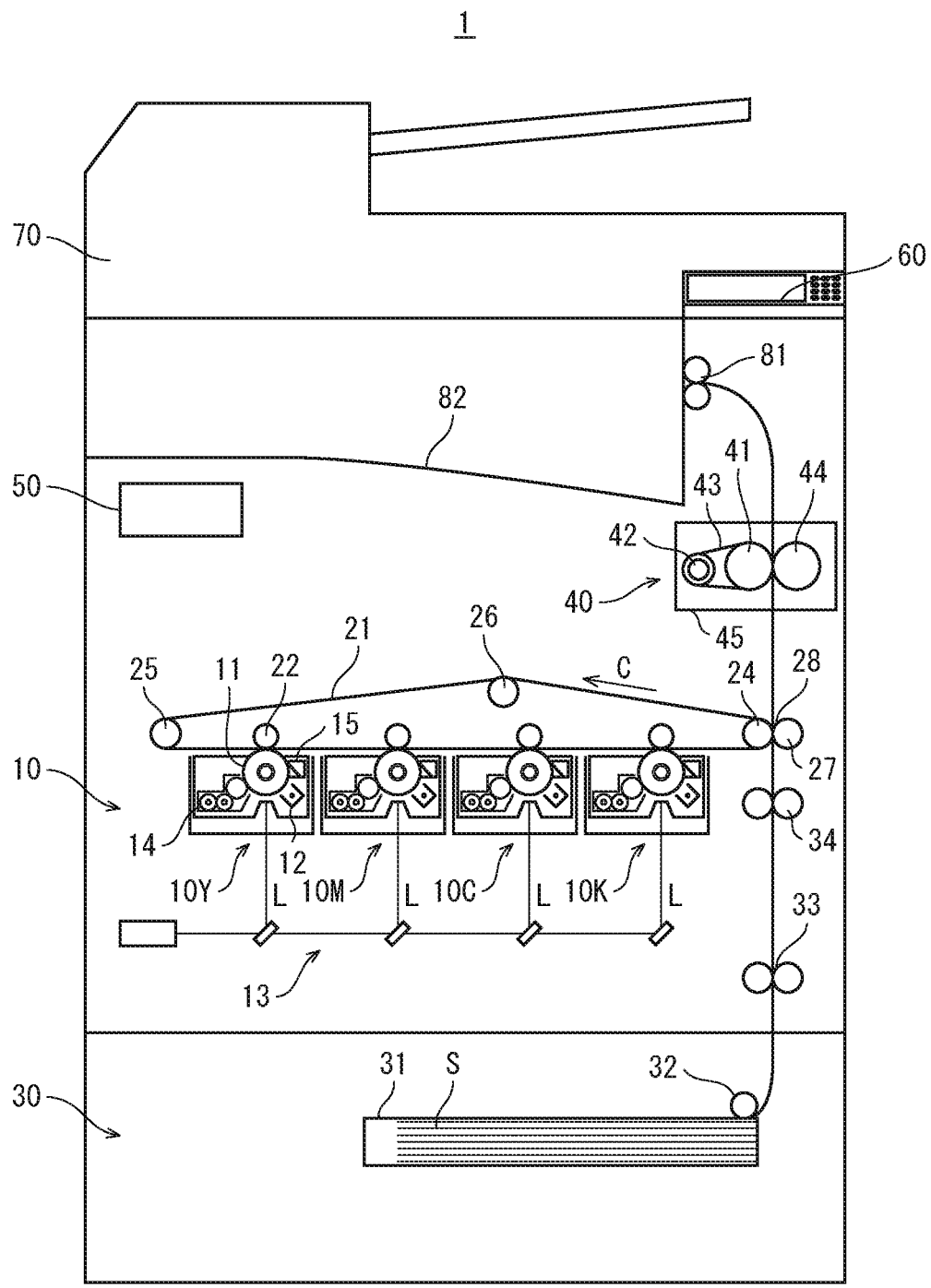
FIG. 2 is a cross-sectional view illustrating the structure of the image forming device 1.

FIG. 2 is a cross-sectional view illustrating the structure of the image forming device 1, which forms images by using the electro-photographic method. As illustrated in FIG. 2, the image forming device 1 includes, in addition to the operation panel 60 and the image reader 70, an image processing unit 10; a paper feeder 30; a fixing device 40; and a control unit 50.

The image forming device 1 is connected to a network, such as a LAN. When receiving a print instruction from an external terminal device (not depicted in any of the drawings) or from the operation panel 60, the image forming device 1 performs printing onto a recording sheet in response to the print instruction by forming toner images of the respective colors yellow, magenta, cyan, and black, and transferring all of the toner images so as to be overlaid on one another on the recording sheet. In the following and in the drawings, the colors yellow, magenta, cyan, and black are respectively indicated by using the alphabets Y, M, C, and K. Further, in the following and in the drawings, constituent elements of the respective colors (e.g., image formers of the respective colors) are distinguished from one another by adding the alphabets Y, M, C, and K to reference numbers.

The image processing unit 10 includes: image formers 10Y, 10M, 10C, 10K; an intermediate image transfer belt 21; and a secondary image transfer roller 27. The image formers 10Y, 10M, 10C, 10K have identical structures, and thus, are described in the following by focusing on the image former 10Y as one example.

The image former 10Y includes: a photosensitive drum 11; a charger 12; an exposure unit 13; a developer 14; and a cleaner 15. The charger 12, the exposure unit 13, the developer 14, and the cleaner 15 are disposed around the photosensitive drum 11. The image former 10Y forms a toner image of color Y on the photosensitive drum 11. The charger 12 charges a circumferential surface of the rotating photosensitive drum 11, and the cleaner 15 cleans the photosensitive drum 11.

The exposure unit 13 includes light-emitting elements such as laser diodes. Upon receiving a drive signal from the control unit 50, the exposure unit 13 emits a laser L for forming an image of the color Y, and exposes the charged circumferential surface of the photosensitive drum 11 to the laser L. Thus, an electrostatic latent image is formed on the photosensitive drum 11.

The developer 14 faces the photosensitive drum 11, and carries toner to the photosensitive drum 11. The intermediate transfer belt 21 is an endless belt that is suspended in tension state across a drive roller 24 and a pair of driven rollers 25, 26, and is driven to rotate in the direction indicated by arrow C in FIG. 1. An electrostatic latent image having been formed on each photosensitive drum (i.e., photosensitive drums of the image formers 10Y, 10M, 10C, 10K) is developed by the developer in the same image former, whereby an unfixed toner image of the corresponding color is formed on the photosensitive drum.

The toner images formed on the photosensitive drums undergo primary transfer by primary transfer rollers provided in one-to-one correspondence with the image formers, and thus are transferred onto the intermediate transfer belt 21. Note that in FIG. 1, only the primary transfer roller corresponding to the image former 10Y is explicitly indicated by being provided with the reference number 22. Here, the primary transfer of the toner images formed on the respective photosensitive drums is performed such that the toner images are transferred at different timings onto the intermediate transfer belt 21 so as to be overlaid one on top of another on the same position of the intermediate transfer belt 21. Subsequently, the electrostatic force applied by the secondary transfer roller 27 causes the toner images on the intermediate transfer belt 21 to undergo secondary transfer, such that the toner images are transferred all at once onto a recording sheet.

The paper feeder 30 includes: a paper supply cassette 31; a feed roller 32; a transport roller pair 33; and a timing roller pair 34. The paper supply cassette 31 accommodates a plurality of recording sheets, one of which is indicated by reference sign S in FIG. 1. The feed roller 32 feeds the recording sheets S onto a sheet transport path, one at a time. The transport roller pair 33 transports the recording sheet S along the sheet transport path.

The timing roller pair 34 transports the recording sheet S to a position 28 where the secondary transfer takes place so that the recording sheet S and the toner images overlaid on the same position of the intermediate transfer belt 11 through primary transfer arrive at the position 28 at the same time. As already discussed above, at the position 28, the secondary transfer roller 27 causes the toner images on the intermediate transfer belt 21 to undergo secondary transfer, such that the toner images are transferred all at once onto the recording sheet S.

The fixing unit 40 includes: a fixing roller 41; a heating roller 42; a fixing belt 43; and a pressing roller 44. Here, as one example, the heating roller is heated by a halogen heater. The fixing belt 43 is suspended in tension state across the fixing roller 41 and the heating roller 42. The pressing roller 44 forms a fixing nip by pressing on the fixing roller 41 with the fixing belt 43 in between. The fixing unit 40, at the fixing nip, applies heat and pressure to the recording sheet S carrying the toner images having been transferred thereon through the secondary transfer, and thereby heat-fixes the toner images onto the recording sheet S.

The above-described components of the fixing unit 40 (i.e., the fixing roller 41, the heating roller 42, the fixing belt 43, and the pressing roller 44) are housed inside a housing 45 of the fixing unit 40. The housing 45 has undepicted slits (openings) formed therein, one at each side thereof in the direction along which the recording sheet S is transported thereto. The slits are for letting the recording sheet S in and out of the housing 45.

The recording sheet S carrying the heat-fixed image is transported to an eject roller pair 81 via a paper ejector (the paper ejector is described in detail later in the present disclosure). Further, the recording sheet S is ejected onto an eject tray 82 by the eject roller pair 81.

The control unit 50 is a so-called computer, and includes a central processing unit (CPU), a read-only memory (ROM), and a random access memory (RAM). The control unit 50 has overall control over the image forming device 1. The operation panel 60 includes a liquid crystal display, a touch panel laminated on the liquid crystal display, and one or more operation buttons allowing input of various instructions. The operation panel 60 receives input of instructions from a user when the user operates the touch panel, the operation buttons, etc., provided to the operation panel 60. The image reader 70 includes an image input device such as a scanner. The image reader 70 reads information from a recording sheet (e.g., a sheet of paper). The information is related to one or more images printed on the recording sheet. The images may be images of characters, shapes, and photographs appearing on the recording sheet. Further, by using the information read from a recording sheet, the image reader 70 generates image data.

[2] Structure of Air Cleaner

Figure 3:
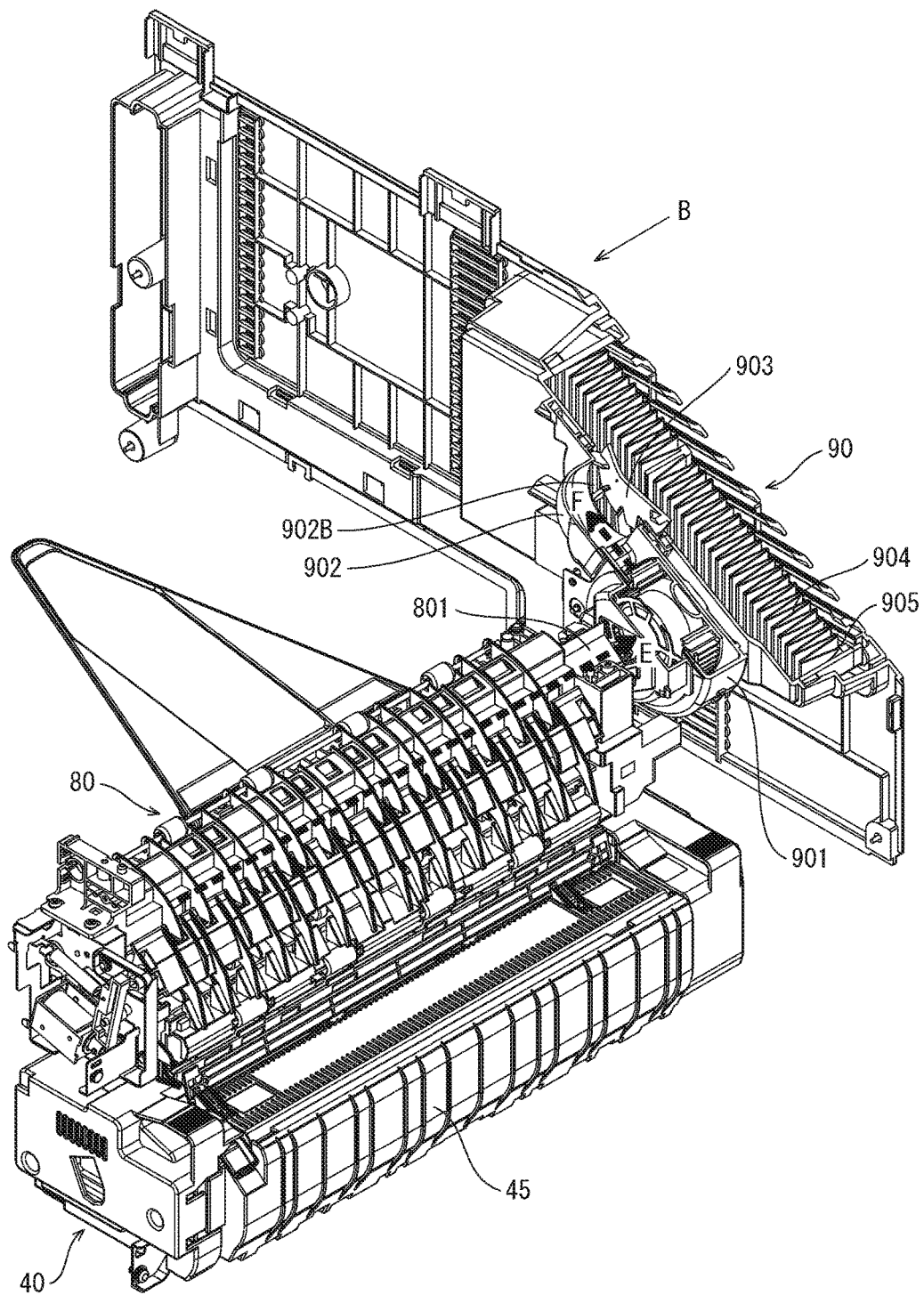
FIG. 3 is a perspective view illustrating the relationship between a fixing device 40, a paper ejector 80, and an air cleaner 90.
Figure 4:
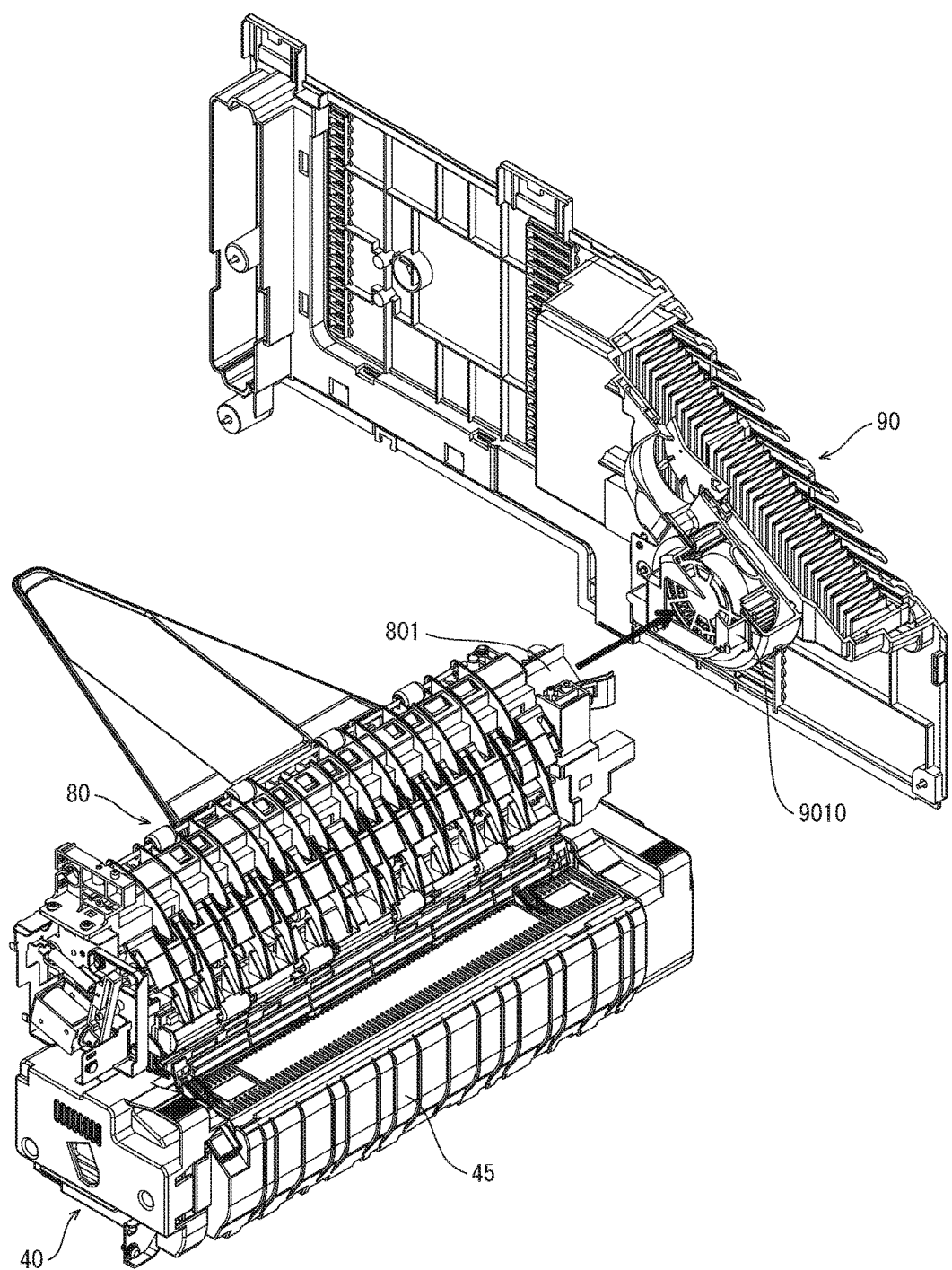
FIG. 4 illustrates a state where the air cleaner 90 has been detached from the paper ejector 80.

FIG. 3 is a perspective view illustrating the relationship between the fixing device 40, a paper ejector 80, and an air cleaner 90. As illustrated in FIG. 3, the air cleaner 90 includes: a fan 901; an air duct 902; an air flow distributer 903; and an electrostatic-type filter 904 (referred to in the following as the "filter 904"). Note that the filter 904 is implemented by using an electrostatic-type filter having a pleated shape. Thus, the main surface of the filter 904 has greater surface area than a main surface of an electrostatic-type filter not having a pleated shape. Further, the air cleaner 90 can be attached to and detached from the paper ejector 80, as illustrated in FIG. 4. Specifically, as illustrated in FIG. 4, the air cleaner 90 can be attached to the paper ejector 80 by causing an engagement portion 9010 provided to the fan 901 to engage with an outlet of a duct 801 of the paper ejector 80, and thereby connecting the fan 901 to the outlet of the duct 801. The engagement portion 9010 is provided with a rectangular opening that allows the engagement portion 9010 to engage with the outlet of the duct 801.

Referring to FIG. 3 once again, the fan 901 is provided at an entrance portion of the air cleaner 90, and is connected to the outlet of the duct 801.

Figure 5:
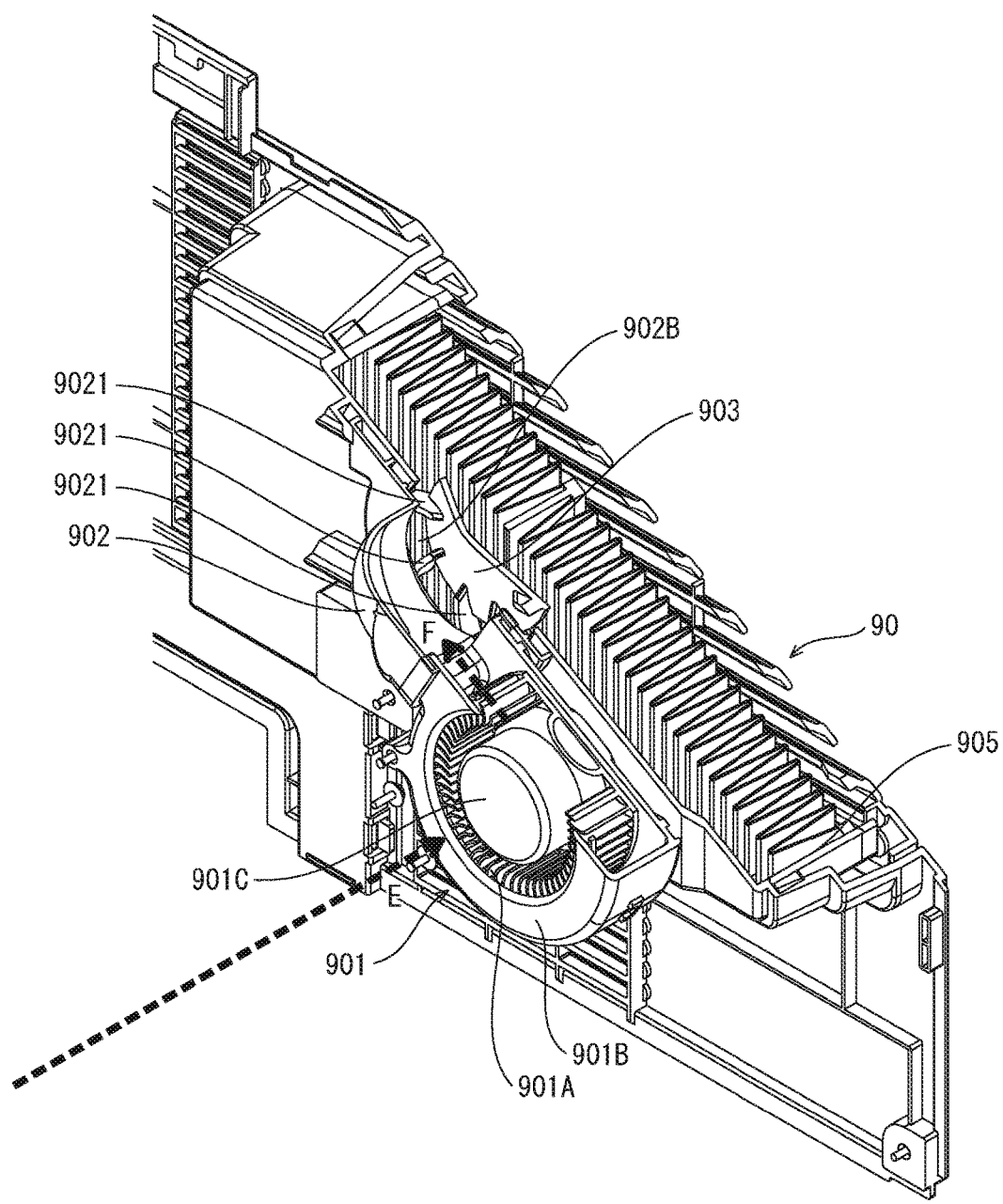
FIG. 5 is a magnified perspective view illustrating the detailed structure of a fan 901 and an air duct 902.

FIG. 5 is a magnified perspective view illustrating the structure of the fan 901 and the air duct 902 in detail. As illustrated in FIG. 5, the fan 901 is a centrifugal fan (sirocco fan), and includes: a blower wheel 901A having a plurality of blades; a casing 901B; and a fan motor 901C. The fan 901 causes air from a main body of the image forming device 1, which includes the fixing device 40 and the surrounding of the fixing device 10, to enter the duct 801 (illustrated in FIG. 3) from an undepicted inlet provided to the duct 801. Note that the air from the main body of the imaging forming device 1 contains atmospheric air and undesirable airborne substances generated at the fixing device 40 and the surrounding of the fixing device 40. Further, the fan 901 takes in the air having entered the duct 801 towards a rotation axis thereof (in the direction illustrated by dotted arrow E in FIGS. 3 and 5) and discharges the air in a direction along the main surface of the filter 904 (the direction illustrated by dotted arrow F in FIGS. 3 and 5), due to centrifugal force caused by rotation so that the air arrives at the inlet of the air duct 902.

Figure 6:
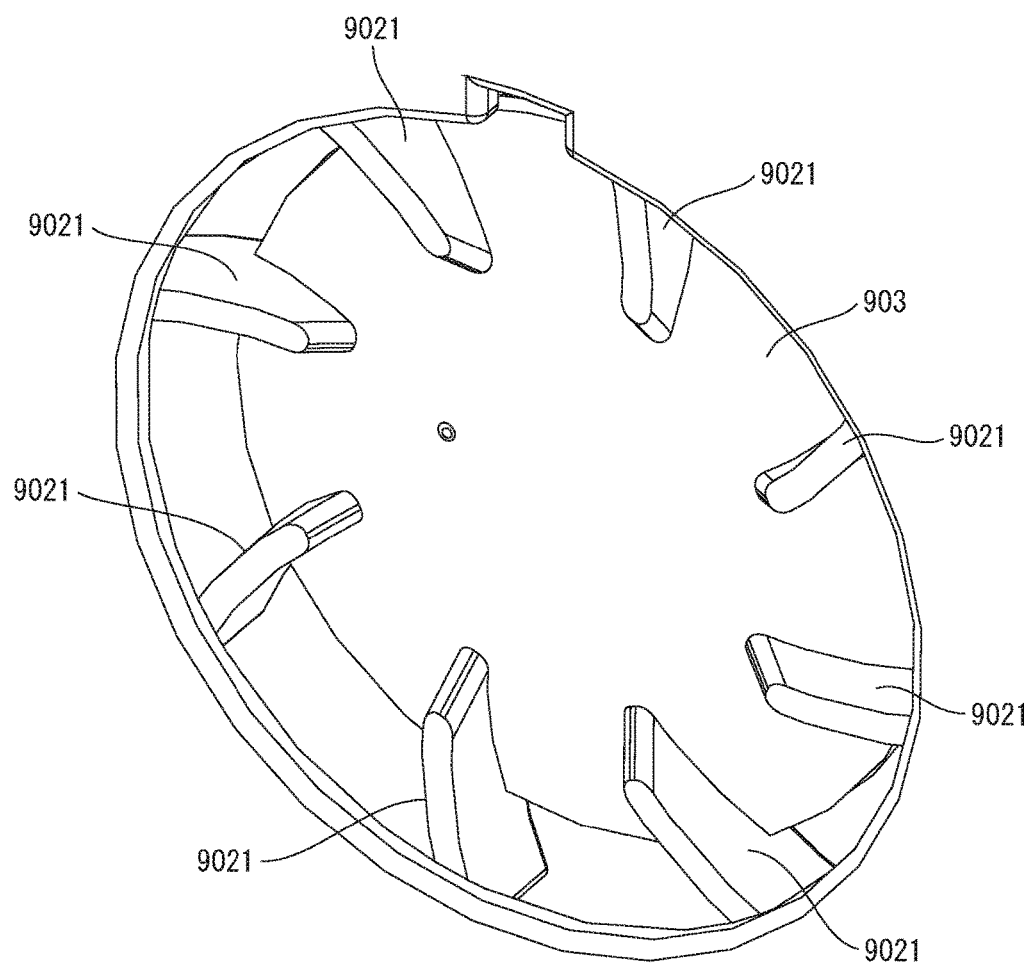
FIG. 6 is a perspective view illustrating ribs 9021 and an air flow distributer 903, as seen from a position upstream than an outlet 902B of the air duct 902 in a direction in which air flows in the air cleaner 90.
Figure 7:
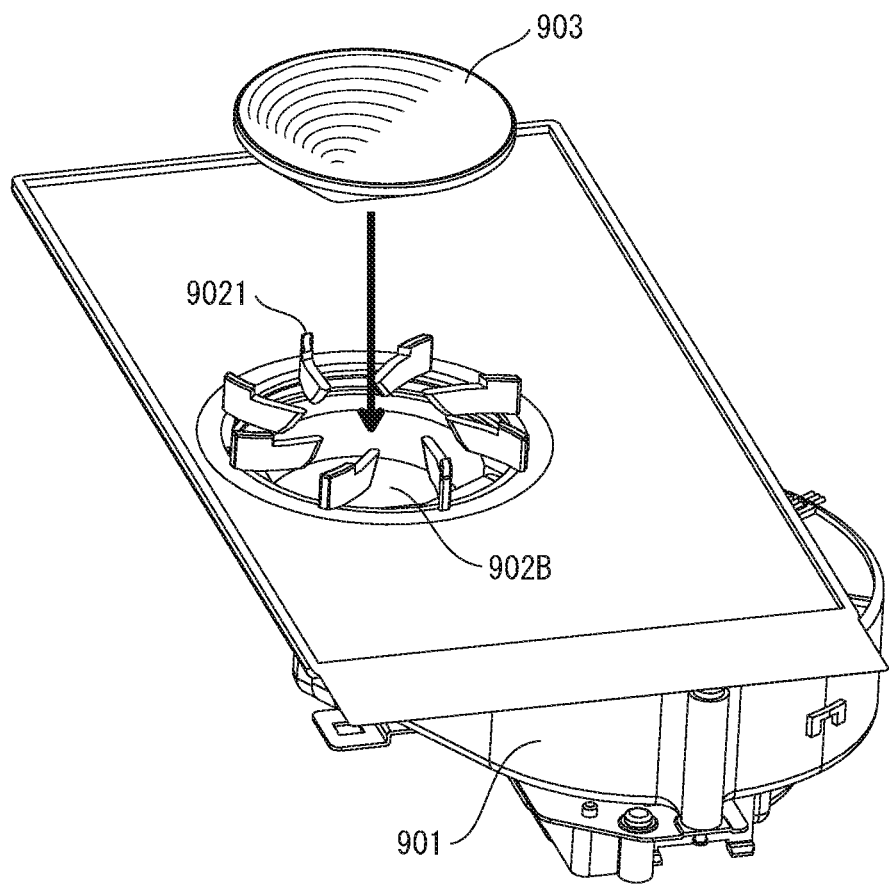
FIG. 7 is an exploded perspective view illustrating the ribs 9021 and the air flow distributer 903, as seen from a position downstream than the outlet 902B of the air duct 902 in the direction in which air flows in the air cleaner 90.

As illustrated in FIGS. 3 and 5, the air duct 902 has a curve between the inlet and an outlet 902B, and faces the main surface of the filter 904 at the outlet 902B. The air duct 902 connects to the inside of a housing 905, which houses the filter 904. Further, as illustrated in FIGS. 5, 6, and 7, ribs 9021 are disposed spirally about the outlet 902B. The ribs 9021 support the air flow distributer 903. The air flow distributer 903 is described in detail later in the present disclosure.

FIG. 6 is a perspective view illustrating the ribs 9021 and the air flow distributer 903, as seen from a position upstream than the outlet 902B in a direction in which air flows in the air cleaner 90. FIG. 7 is an exploded perspective view illustrating the ribs 9021 and the air flow distributer 903, as seen from a position downstream than the outlet 902B in the direction in which air flows in the air cleaner 90.

In specific, FIG. 7 is an exploded perspective view illustrating how the ribs 9021 are formed about the outlet 902B, which is formed in an outlet part member of the air duct 902. Further, FIG. 7 illustrates how the ribs 9021 support the air flow distributer 903, and illustrates that a portion of the air flow distributer 903 facing the outlet 902B has an asymmetric conical shape.

The ribs 9021 are formed spirally, to conform to a direction in which air discharged from the outlet 902B whirls. Here, note that the air flow distributer 903 may either be adhered to the ribs 9021 or integrally formed with the ribs 9021.

Meanwhile, it is also possible to fix the position of the air flow distributer 903 inside the housing 905 without providing the ribs 9021. However, providing the ribs 9021 allows effectively guiding air discharged from the outlet 902B to the air flow distributer 903 along the ribs 9021. Thus, providing the ribs 9021 reduces pressure loss of air discharged from the outlet 902B and improves discharge efficiency compared to not providing the ribs 9021.

Returning to FIG. 3 once again, the air taken-in to the air duct 902 leaves the air duct 902 via the outlet 902B, and enters the housing 905 by flowing along the portion of the air flow distributer 903 facing the outlet 902B. The air flow distributer 903 is disposed between the outlet 902B and the filter 904. As already described above, the housing 905 houses the filter 904. Thus, the undesirable airborne substances contained in the air from the main body of the image forming device 1 are captured at the filter 904, before being discharged to the outside.

Accordingly, the air from the main body of the image forming device 1 is prevented from directly reaching an area of the main surface of the filter 904 facing the outlet 902B, from the outlet 902B. That is, a direction in which the air discharged from the outlet 902B flows is changed so that the air spreads over the entirety of the main surface of the filter 904 without intensively flowing towards the area of the main surface of the filter 904 facing the outlet 902B.

Here, it should be noted that the portion of the air flow distributer 903 facing the outlet 902B may have any shape as long as capable of changing the direction of flow of the air discharged from the outlet 902B to spread over the entirety of the main surface of the filter 904. For example, the portion of the air flow distributer 903 facing the outlet 902B may have any one of the shapes illustrated in FIGS. 8, 9, 10.

Figure 8:
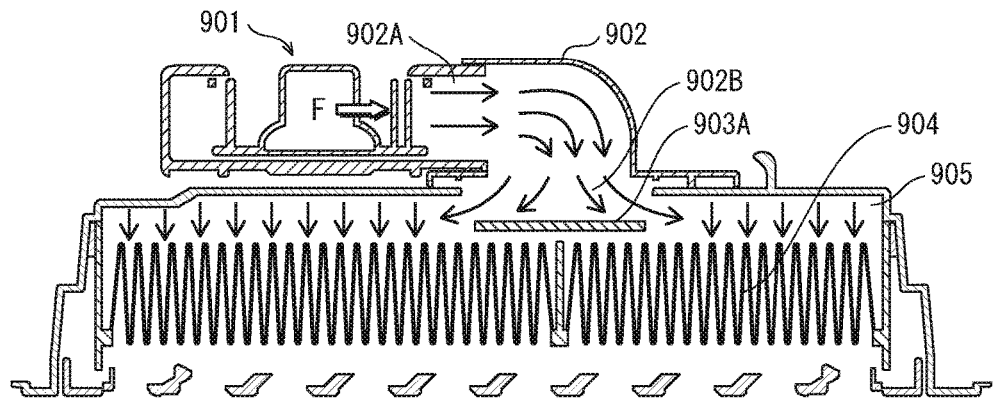
FIG. 8 is a schematic illustrating air flow from the air duct 902 to an electrostatic filter 904, when the air flow distributer 903 is implemented by using a member whose portion facing the outlet 902B has a flat, circular disc shape.

FIG. 8 is a schematic illustrating air flow from the air duct 902 to the filter 904 when the portion of the air flow distributer 903 facing the outlet 902B has a flat plate-like shape (in FIG. 8, the portion of the air flow distributer 903 facing the outlet 902B has a circular disk-like shape). In FIG. 8, reference symbols 901, 902, 902A, 902B, 903, 904, and 905 respectively indicate the fan, the air duct, the inlet of the air duct, the outlet of the air duct, the air flow distributer, the filter, and the housing. Further, in FIG. 8, air flow is indicated by using arrows, and the white arrow indicated by reference symbol F indicates the direction in which the air is discharged from the fan 901 to the air duct 902. The above explanations similarly apply to each of FIGS. 9 and 10.

As illustrated in FIG. 8, the air guided to the outlet 902B collides with and spreads along the flat surface of the portion of the air flow distributer 903 facing the outlet 902B, thereby spreading over the entirety of the surface of the filter 904. Although not illustrated in FIG. 8, it should be noted that due to collision with the inner wall of the housing 905, the surface of the filter 904, etc., and the consequent change in flow direction, some of the air also reaches the area of the filter 904 facing a rear surface of the air flow distributer 903, however smaller the amount of the air reaching this area of the filter 904 may be than the amount of the air reaching other areas of the filter 904. This similarly applies to each of FIGS. 9 and 10, description related to which is provided in the following.

Figure 9:
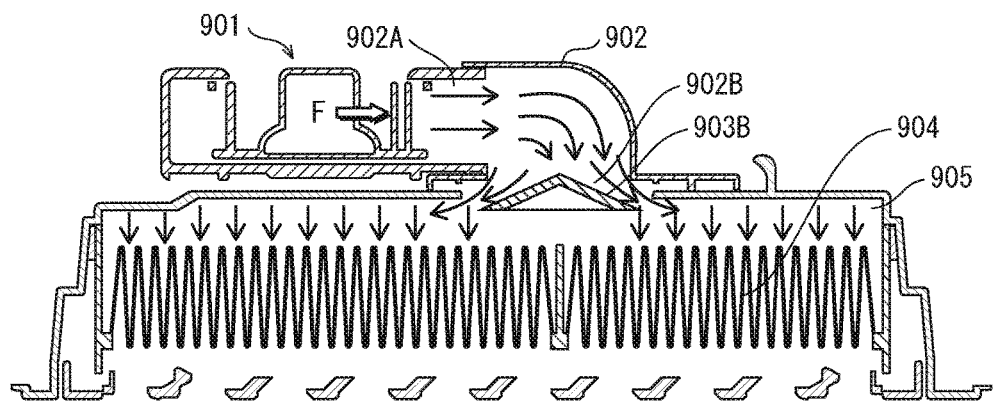
FIG. 9 is a schematic illustrating air flow from the air duct 902 to the electrostatic filter 904, when the air flow distributer 903 is implemented by using a member whose portion facing the outlet 902B has a symmetric conical shape.

FIG. 9 is a schematic illustrating air flow from the air duct 902 to the filter 904 when the portion of the air flow distributer 903 facing the outlet 902B has a symmetrical conical shape. Similar to the configuration illustrated in FIG. 8, in the configuration illustrated in FIG. 9, the air guided to the outlet 902B collides with and spreads along the inclined lateral surface of the conical portion of the air flow distributer 903 facing the outlet 902B, thereby spreading over the entirety of the main surface of the filter 904. In addition, providing the portion of the air flow distributer 903 facing the outlet 902B with a conical shape reduces pressure loss of the air discharged from the outlet 902B compared to when the portion has a flat surface, and thereby improves discharge efficiency, due to the air discharged from the outlet 902B being distributed to the entirety of the main surface of the filter 904 through collision with the inclined lateral surface of the conical portion of the air flow distributer 903 facing the outlet 902B.

Figure 10:
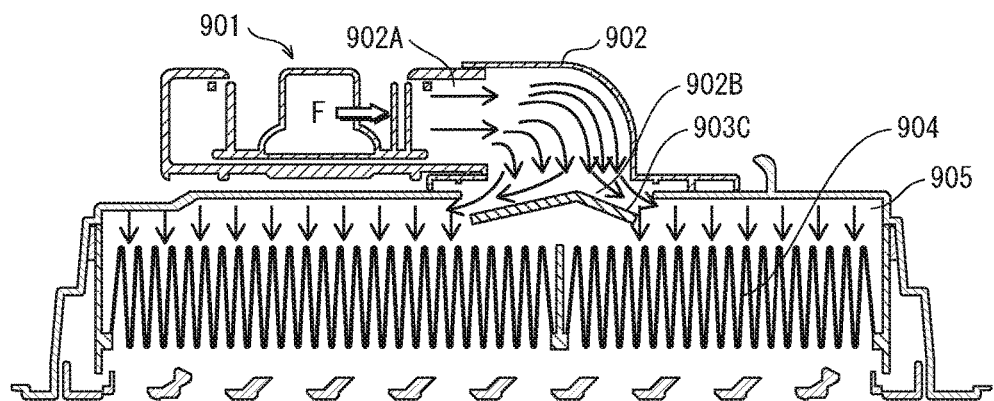
FIG. 10 is a schematic illustrating air flow from the air duct 902 to the electrostatic filter 904, when the air flow distributer 903 is implemented by using a member whose portion facing the outlet 902B has an asymmetric conical shape.

FIG. 10 is a schematic illustrating air flow from the air duct 902 to the filter 904 when the portion of the air flow distributer 903 facing the outlet 902B has an asymmetric conical shape. Here, the flow distributor 903 is disposed such that the apex of the conical portion facing the outlet 902B is offset in the direction F, in which the air is discharged from the outlet 902B, with respect to the center of the outlet 902B (i.e., with respect to the apex of the conical portion of the flow distributor 903 illustrated in FIG. 9). Similar to the configuration illustrated in FIG. 9, in the configuration illustrated in FIG. 10, the air guided to the outlet 902B collides with and spreads along the inclined lateral surface of the conical portion of the air flow distributer 903 facing the outlet 902B, thereby spreading over the entirety of the main surface of the filter 904. In addition, providing the portion of the air flow distributer 903 facing the outlet 902B with a conical shape reduces pressure loss of the air discharged from the outlet 902B compared to when the portion has a flat surface, and thereby improves discharge efficiency, due to the air discharged from the outlet 902B being distributed to the entirety of the main surface of the filter 904 through collision with the inclined lateral surface of the conical portion of the air flow distributer 903 facing the outlet 902B.

In addition, in the configuration illustrated in FIG. 10, a portion of the inclined lateral surface of the conical portion of the air flow distributer 903 that extends from the apex towards the direction opposite the direction F (referred to in the following as reverse-direction inclined surface portion) has greater surface area than a portion of the inclined lateral surface of the conical portion of the air flow distributer 903 that extends from the apex towards the discharge direction F (referred to in the following as forward-direction inclined surface portion). Accordingly, the air discharged from the outlet 902B is more likely to be guided towards the reverse-direction inclined surface portion than towards the forward-direction inclined surface portion. Thus, the air flow distributer 903 is capable of changing the direction of air flow so that air flow is not biased towards the discharge direction F.

Here, it should be noted that the air is discharged from the outlet 902B towards the discharge direction F. Thus, when surface area of the reverse-direction inclined surface portion is equal to the surface area of the forward-direction inclined surface portion, the amount of the discharged air arriving at the forward-direction inclined surface portion would be greater than the amount of the discharged air arriving at the reverse-direction inclined surface portion. This results in the amount of undesirable airborne substances captured differing between an area of the main surface of the filter 904 that is located in the discharge direction F from the area of the main surface of the filter 904 facing the outlet 902B and an area of the main surface of the filter 904 that is located in the direction opposite the discharge direction F from the area of the main surface of the filter 904 facing the outlet 902B.

In view of this, providing the portion of the air flow distributer 903 facing the outlet 902B with an asymmetric conical shape as illustrated in FIG. 10 suppresses such difference in the amount of undesirable airborne substances captured by different areas of the filter 904. This further prevents a difference in filter performance occurring between different areas of the filter 904.

As such, in the present embodiment, the distance between the outlet 902B of the air duct 902 and where the filter 904 is located in the housing 905 is relatively small. Further, the air cleaner 90 has an air flow path having greater cross-sectional area in the housing 905, into which the air discharged from the outlet 902B is input, than at the outlet 902B, and the air flow distributer 903 is disposed between the outlet 902B and the filter 904, near a downstream side of the outlet 902B in the direction of air flow. As already described above, the air flow distributer 903 distributes the air discharged from the outlet 902B by changing the direction of air flow. Due to this, the direction of air flow from the outlet 902B into the housing 905B is changed so that air flow is not intensified towards the area of the main surface of the filter 904 facing the outlet 902B and the discharged air arrives at areas of the main surface of the filter 904 other than the area facing the outlet 902B.

This prevents a rapid decrease in filter performance from occurring at the area of the main surface of the filter 904 facing the outlet 902B. Thus, clogging of the area of the main surface of the filter 904 facing the outlet 902B is suppressed, and, a shortening of lifetime of the filter 904 is prevented. That is, the present embodiment suppresses a local decrease in filter performance, and thereby extends the lifetime of the filter 904.

(Modifications)

In the above, the technology pertaining to the present disclosure is described based on a specific form of embodiment thereof. However, needless to say, the embodiment merely provides a non-limiting example of how the technology pertaining to the present disclosure may be implemented, and it should be construed that the present disclosure encompasses in the spirit and scope thereof, for example, the modifications described in the following.

(1) In the embodiment, a conical shape is discussed as one specific example of a shape of the portion of the air flow distributer 903 facing the outlet 902B that reduces pressure loss occurring when the air comes in contact with the air flow distributer 903. However, as long as the air flow distributer 903 is capable of reducing such pressure loss, the portion of the air flow distributer 903 facing the outlet 902B may have any shape forming a mountain-shaped protrusion, such as a pyramid shape, a frustum shape, and a circular truncated cone shape.

When making such a modification, in order to achieve a further reduction in pressure loss, a slope of the mountain-shaped protrusion may be curved to form a concave shape.

(2) The portion of the air flow distributer 903 facing the outlet 902B may have one or more through-holes formed therein. This allows the air discharged from the outlet 902B to reach the area of the main surface of the filter 904 that faces the rear surface of the air flow distributer 903 (i.e., a portion of the air flow distributer 903 not facing the outlet 902B). This reduces a difference in the amount of air flow reaching the area of the main surface of the filter 904 facing the rear surface of the air flow distributer 903 and the amount of air flow reaching other areas of the main surface of the filter 904. Accordingly, the risk is reduced of a difference in filter performance occurring between the area of the main surface of the filter 904 facing the rear surface of the air flow distributer 903 and other areas of the main surface of the filter 904.

(3) In the embodiment, the filter 904 is implemented by using an electrostatic-type filter having a pleated shape. However, needless to say, the air flow distributer 903 pertaining to the embodiment is usable in combination with other filters, including electrostatic-type filters not having a pleated shape and filters of types other than the electrostatic-type.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An air cleaner having a filter, causing air from an image forming device to pass through the filter and discharging the filtered air, the air cleaner comprising:
   an air duct having an inlet via which air from the image forming device is received and an outlet facing a first part of a main surface of the filter and via which the received air is output in a direction towards the first part of the main surface;
   a fan causing air from the image forming device to be received by the air duct via the inlet, to be output from the air duct via the outlet, and to pass through the filter; and
   only a single flow distributer disposed between the outlet and the filter, the flow distributer changing a direction of flow of air output from the air duct from the direction towards the first part of the main surface to a direction towards a second part of the main surface of the filter, the second part being a part of the main surface that does not face the outlet,
   wherein the flow distributer has a single conical mountain-shaped protrusion protruding towards the outlet.

2. The air cleaner of claim 1, wherein:
   the air duct has a curve between the inlet and the outlet, and
   a path of air flow has greater cross-sectional area between the outlet and the main surface of the filter than at the outlet.

3. The air cleaner of claim 1, wherein:
   the fan takes in air from the image forming device at a position upstream from the inlet along the path of air flow, and discharges the air taken-in in a direction along the main surface of the filter to be received by the inlet, and
   the flow distributer has an asymmetric conical shape with an apex thereof offset from a center of the outlet in the direction in which air is discharged from the fan.

4. The air cleaner of claim 1, further comprising:
   a plurality of ribs disposed about the outlet,
   wherein the flow distributer is supported by the ribs.

5. The air cleaner of claim 4, wherein the ribs are disposed spirally about the outlet.

6. An image forming device comprising:
   the air cleaner of claim 1.

7. The image forming device of claim 6, wherein the air cleaner is disposed at a rear side of the image forming device.

8. The air cleaner of claim 1, wherein the fan causes air from a fixing device of the image forming device to be received by the air duct via the inlet.

9. An image forming system, comprising:
   an image forming device including a fixing device; and
   the air cleaner of claim 1 configured to receive air from the fixing device.

10. The air cleaner of claim 1, wherein the filter is configured to obstruct flow of volatile organic compounds.

11. An air cleaner having a filter, causing air from an image forming device to pass through the filter and discharging the filtered air, the air cleaner comprising:

an air duct having an inlet via which air from the image forming device is received and an outlet facing a first part of a main surface of the filter and via which the received air is output in a direction towards the first part of the main surface;

a fan causing air from the image forming device to be received by the air duct via the inlet, to be output from the air duct via the outlet, and to pass through the filter; and a flow distributer disposed between the outlet and the filter, the flow distributer changing a direction of flow of air output from the air duct from the direction towards the first part of the main surface to a direction towards a second part of the main surface of the filter, the second part being a part of the main surface that does not face the outlet, wherein the flow distributer has a mountain-shaped protrusion protruding towards the outlet, and wherein the mountain-shaped protrusion has an asymmetric conical shape.

12. The air cleaner of claim 11, wherein the flow distributer has an apex offset from a center of the outlet in the direction in which air is discharged from the fan.

* * * * *